United States Patent
Birenbaum et al.

(10) Patent No.: US 8,452,708 B1
(45) Date of Patent: May 28, 2013

(54) UNIVERSAL PAYMENT PROCESSING

(76) Inventors: Arnold N Birenbaum, San Jose, CA (US); Michael Milan Radlovic, Claremont, CA (US)

( * ) Notice: Subject to any disclaimer, the term of this patent is extended or adjusted under 35 U.S.C. 154(b) by 0 days.

(21) Appl. No.: 13/225,437

(22) Filed: Sep. 3, 2011

(51) Int. Cl.
*G06Q 40/00* (2012.01)

(52) U.S. Cl.
CPC ..................................... *G06Q 40/00* (2013.01)
USPC ................. 705/40; 705/35; 705/38; 705/39

(58) Field of Classification Search
None
See application file for complete search history.

(56) References Cited

U.S. PATENT DOCUMENTS

| | | | |
|---|---|---|---|
| 7,702,577 B1* | 4/2010 | Dickelman | 705/39 |
| 7,810,134 B2* | 10/2010 | Loomis et al. | 726/2 |
| 7,882,028 B1* | 2/2011 | Devine et al. | 705/39 |
| 2004/0193537 A1* | 9/2004 | Knapp | 705/39 |
| 2004/0267663 A1* | 12/2004 | Karns et al. | 705/40 |
| 2005/0144130 A1* | 6/2005 | Staniar et al. | 705/40 |
| 2005/0165682 A1* | 7/2005 | Duke | 705/41 |
| 2005/0182724 A1* | 8/2005 | Willard | 705/44 |
| 2006/0289621 A1* | 12/2006 | Foss et al. | 235/375 |
| 2007/0131760 A1* | 6/2007 | Aggarwal | 235/441 |
| 2007/0192235 A1* | 8/2007 | Menichilli et al. | 705/38 |
| 2008/0288396 A1* | 11/2008 | Siggers et al. | 705/39 |
| 2009/0112662 A1* | 4/2009 | Mullen et al. | 705/7 |
| 2009/0119176 A1* | 5/2009 | Johnson | 705/14 |
| 2009/0164331 A1* | 6/2009 | Bishop et al. | 705/19 |
| 2009/0210343 A1* | 8/2009 | Griffin | 705/40 |
| 2010/0036758 A1* | 2/2010 | Monk | 705/30 |
| 2010/0042537 A1* | 2/2010 | Smith et al. | 705/40 |
| 2010/0063903 A1* | 3/2010 | Whipple et al. | 705/30 |
| 2010/0114713 A1* | 5/2010 | Anderson | 705/14.69 |
| 2010/0198711 A1* | 8/2010 | Rolf | 705/30 |
| 2010/0274719 A1* | 10/2010 | Fordyce, III | 705/44 |
| 2011/0246387 A1* | 10/2011 | Ross et al. | 705/36 R |
| 2012/0035946 A1* | 2/2012 | Coyne | 705/2 |
| 2012/0072305 A1* | 3/2012 | Vadhri et al. | 705/26.41 |

* cited by examiner

*Primary Examiner* — Gregory Johnson
(74) *Attorney, Agent, or Firm* — Stephen E. Zweig

(57) ABSTRACT

A computerized universal payment method to allow merchants with differing risk tolerance, transaction fee tolerance, and payment time tolerance to optimize customer payment transactions that have different risks, transaction fees, and transaction times. Here customer payments are converted to a synthetic financial account (a universal payment account) that acts somewhat like a financial marketplace between a plurality of merchants and customers. The method adjusts for the risks, transaction fee, and payment times associated with a customer's particular mode of payment, as well as adjusting for the merchant's tolerance for risks, transaction fees, and payment times, as well as optionally the merchant's knowledge about the customer. Thus, given permission, a customer paying by a high commission credit card, may upon merchant election have this payment converted to a low commission electronic check, and vice versa. Various electronic transaction headers, point-of-service, electronic market, and customer permission factors are also discussed.

20 Claims, 6 Drawing Sheets

UNIVERSAL PAYMENT PROCESSING

BACKGROUND OF THE INVENTION

1. Field of the Invention

This invention is in the general field of electronic payment methods, and more specifically as related to point-of-sale transactions between customers, merchants, and merchant banks.

2. Description of the Related Art

Electronic payment methods, in which consumers can conveniently pay by credit cards, debit cards, electronic checks, and other payment methods, have become popular in recent years. Generally, these methods are implemented by various computerized devices, including various point-of-sale terminals, communication networks (e.g. everything from analog telephone lines to high speed dedicated computer networks, including the Internet), computer servers, databases, and the like.

Electronic payment methods facilitate commerce because customers can more easily make quick decisions to purchase items and services without the burden of having to carry cash, or having to pay using slow and laborious methods such as mailing cash or checks. Merchants also appreciate these various electronic payment methods because they stimulate business. In particular the practice of extending at least short-term credit card credit to customers stimulates commerce because customers to not have to save up for long periods of time before purchasing items and services, and thus are more open to new expenditures.

Unfortunately, some customers do not always pay their bills on time, and some customers do not pay at all. Thus, as for any type of non-cash payment there is always some element of risk involved in electronic payment methods.

Many merchants dislike this risk, and as a result, various electronic payment intermediary services, most famously Visa and MasterCard, have emerged to help merchants manage risk. Credit card services such as Visa and MasterCard agree that provided that the merchant complies with their rules, Visa and MasterCard will assume at least some of the risk of customer non-payment.

These services charge both participating merchants and customers for this risk management function. Customers are charged varying interest rates on the balances in their credit accounts according to various formulas, such as FICO scores. Merchants are also charged as well, typically on the order of a 3% transaction fee per transaction.

By contrast, other forms of electronic payment are often lower risk. Debit or ATM cards, for example, which draw upon consumer money that is presumed to be already on deposit in a bank or other financial institution, are considered to be less risky. Thus, in contrast to the 3% rates charged to merchants for credit card purchase, electronic debit cards may charge the merchant only about 60 cents per transaction.

However there is still some element of risk even with debit cards, because due to the high speed of the electronic transactions, there is always a chance that the debit card limit information may be out of date, if only by a few minutes or seconds, and thus there is some remaining chance of payment problems.

By contrast, electronic checks, which often take several days to clear, give the lowest level of risk. Due to the high efficiency of modern computerized communication and database methods, absent risk, the actual transaction costs are quite low, and thus the merchant may only be charged a few cents (e.g. around five cents) per transaction, and the consumer will often be charged nothing.

BRIEF SUMMARY OF THE INVENTION

The invention is based, in part, on the insight that the present electronic payment system, although forming the basis for most of the modern economy, is in some respects inefficient, particularly from the standpoint of the merchant, and that an alternative method of electronic payment would be desirable.

For example, depending on customer choice of payment method, the merchant return from the same customer of the same $100 item from a merchant may range from as much as $100 (cash on the spot) to $99.95 (electronic check) to $99.40 (debit card) to $97.00 (credit card). The various payment times can range from instant payment (cash or credit card) to up to several days (electronic check). Many merchants operate on thin margins, and in aggregate, these differences over many transactions can have a huge impact on merchant profitability.

Unfortunately merchants are somewhat limited in their ability to suggest more efficient methods of payment to their customers. The message, "please don't pay by credit card because we don't really trust you, and we also really need the money" just does not go over well. The alternative message, "please pay by check because we are really cheap and need all the money we can get" lacks charm as well, and the message "we're about ready to go under, so please pay by cash or some other way that we can get money today, we'll accept the higher payment fees" is perhaps less than optimal as well. Thus in general, merchants are often compelled, at least by business and social considerations, to provide various methods of payment, to charge the same price for their items and services, regardless of customer method of payment, and to grit their teeth and smile at whatever the customer chooses.

The invention is also based, in part, on the insight that the present methods of managing consumer risk do not adequately take differences between merchants into account. In particular, the present invention is based upon the insight that an improved electronic payment method that took into account differences in between individual merchant's tolerance for risk, need for rapid payment, and need for low payment fees might offer some compelling advantages for electronic commerce. In some embodiments, the system might also utilize the merchant's knowledge about the customer making the transaction to achieve higher efficiency as well.

The invention is also based, in part on the insight that such an improved method should ideally allow merchant's to reset a method of customer payment, at least with customer approval, to an alternative method of payment that best meets the merchant's particular tolerance for risk, need for rapid payment, need for fast payment, and optionally also knowledge about the customer.

According to the invention, in at least one embodiment, merchants accepting payment by one modality may form an electronic marketplace with other merchants accepting payment by a different modality, and with appropriate exchanges of information (e.g. user identities) to satisfy various anti-money laundering statutes, as well as other statutes such as the patriot act, form an electronic payment exchange.

In alternative embodiments, if for example a customer pays by credit card, but the merchant is confident in the customer, and/or has sufficient financial resources so that the merchant is willing to self-insure against customer risk, or is willing to put up with a longer payment cycle, then the invention might also allow the merchant to automatically redirect this payment to an alternative payment method, such as debit card or check. Conversely a merchant who has a cash flow issue, and who wants to accelerate an echeck payment, might elect to pay the higher charges to speed up the transaction, with or without assumption of risk according to merchant preference.

The invention is also based, in part, upon the insight that in order to facilitate such an improved method, what is needed is a new type of universal payment account, computerized method, and system with associated account information, permissions, privileges, exchange algorithms, and payment exchange methods that allows merchants to make these conversions as desired.

Thus in some embodiments, the invention may be a computerized universal payment method to allow merchants with differing risk tolerance, transaction fee tolerance, and payment time tolerance to optimize customer payment transactions that have different risks, transaction fees, and transaction times. In some embodiments, the method may operate by converting customer payments are to a synthetic financial account (a universal payment account) that acts somewhat like a financial marketplace between a plurality of merchants and customers. The method adjusts for the risks, transaction fee, and payment times associated with a customer's particular mode of payment, as well as adjusting for the merchant's tolerance for risks, transaction fees, and payment times, and optionally the merchant's knowledge about the customer. Thus, with proper permissions, a customer paying by, for example, a high commission credit card, may upon merchant election have this payment converted to a low commission electronic check. Alternatively a customer paying by electronic check might have this payment converted to a credit card payment if the merchant has a rapid need of funds, or optionally does not fully trust the customer.

DETAILED DESCRIPTION

Figure 1A:
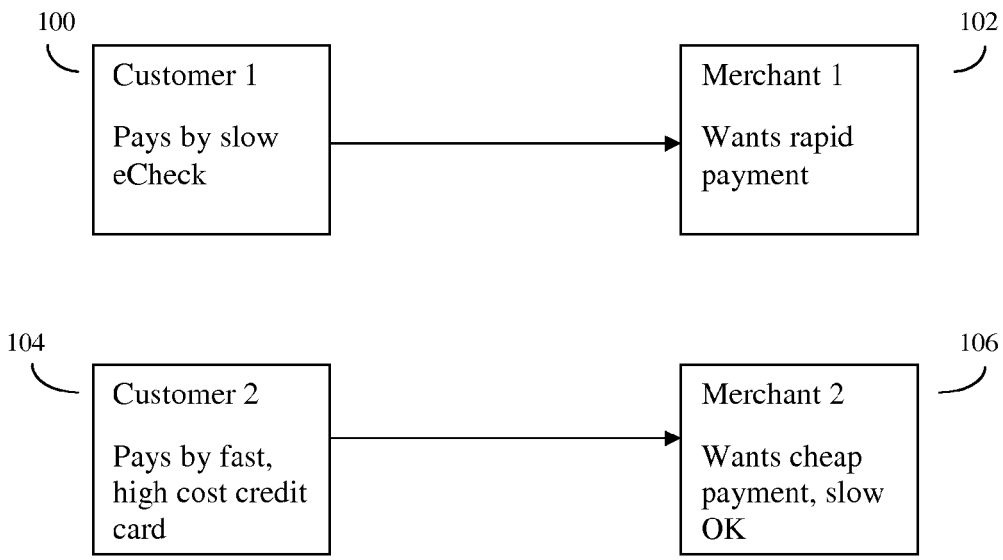
FIG. 1A shows the prior art method of payments, where each customer payment is directed to the merchant without any change in payment form.

It has been decades since the original electronic financial transaction standards and data formats were created for the payment card and check processing industries. Since this time, many new electronic payment standards, such as Internet specific formats (SET) and gateways, standards for digital check images, and the like have added new electronic data formats that are specific to their respective functions.

Some of the various financial transaction standards and regulations presently in effect for financial transactions include the Association for Retail Technology Standard (ARTS) standards, unified Point of Sale (POS) standards (e.g. UnifiedPOS). In addition to these standards, there are many laws and regulations as well, including various Federal regulations such as the various Federal Reserve System regulations (e.g. 12 CFR 201-233, 12 CFR 250, 12 CFR 208 and 225) the Patriot Act, various anti-money laundering statutes, and so on.

Over the last few decades, there have also been major advances in the computer system hardware, software, and networking capability used to conduct these electronic financial transactions. The trend now, in contrast to the more isolated data world of just a few years ago, is to move to a world where data is more freely shared; allowing formerly separate functions to now become more highly integrated and automated.

Many of these financial transaction standards and data format were originally optimized in an environment where communication networks were expensive. By contrast in today's world, advances in electronic networks are such that communications are now the smallest part of the financial transaction cost structure. Instead, the financial cost structures now largely revolve around risk management. This risk management is also a function of available data, in particular data regarding the customer.

As previously discussed, at present, merchants are required by various legacy electronic transaction systems to process their various payment transactions in the same manner in which the payment transaction was originally presented. As a result, merchants often end up in situations where they are paying higher transaction costs than the merchant would like (i.e. paying credit card risk management fees when the merchant is either able to self-insure, or alternatively where the merchant knows that the customer is trustworthy), or where the merchant is waiting longer for payment than optimal (i.e. customer has paid by check, but the merchant is low on cash and would have been willing to pay extra for faster access to cash).

By contrast, the present invention utilizes a new payment processing system and method, here called a universal payment system, universal processing method, or occasionally in the alternative universal payment account or universal payment marketplace intended to help minimize these problems.

As previously discussed, in one embodiment, the invention may be a computerized universal payment method to allow merchants with differing risk tolerance, transaction fee tolerance, and payment time tolerance to optimize customer payment transactions that have different associated risks, associated transaction fees, and associated transaction times. The method will generally involve first converting an initial customer payment, which may have been made using a method that at least initially specified a first customer payment method, risk, transaction fee, and payment time, into a universal payment account.

To show the method and system of the present invention, first consider prior art payment methods, as shown in FIG. 1A. Here a first customer (100) may have paid a first merchant (102) by a slow but low payment cost method, such as electronic check. Although this particular merchant (102) may have a severe cash flow problem, and really would prefer a quicker payment, the merchant has no choice but to accept a slow electronic check. Similarly a second customer (104) may have paid a second merchant (106) by credit card. This second merchant may know that the first customer is trustworthy, and may have no immediate need for funds, and thus would find it more ideal to be paid by electronic check. However this merchant also is stuck with the method of payment as presented by the customer.

The universal payment system, method, or account may be implemented in a variety of ways.

In one embodiment, the various conversion factors required to transfer funds from the initial customer payment to the universal payment account, and then back to the various payment modalities requested by the merchant, may be computed based on various factors, such as a first discount factor that takes into account the risk, assuming the original customer method of payment, that the customer may default on the payment, a second discount factor such as the commissions associated with the original customer method of payment, and a third discount factor that may be based on the time value of money—i.e. the speed of payment associated with the original customer method of payment.

As an example, assume here that the ideal universal payment account (that is form that has the lowest discount from cash) would a zero transaction electronic check (that is money drawn from an account known to have sufficient funds) that would clear instantly. In this hypothetical ideal, a first $100 customer payment to a first merchant would translate into the same $100 in the universal payment account.

However in real life, if the first customer's electronic check costs $0.05 in transaction costs, then the $100 customer payment, if it would clear instantly translates into only $99.95 in the universal payment account for the first customer.

In fact, assuming that the typical electronic check would take 3 days to clear, then the value of the first customer's payment in the universal payment account would be further discounted by the 3-day time value of money.

By contrast, consider the ideal universal payment amount for a second customer that has just paid a $100 fee by to a second merchant by credit card. Assuming a nominal credit card fee of 3% would translate into $97.00 in the universal payment account, but here since credit cards normally clear almost instantly, the time value of money discount would be almost zero.

In this example, the second merchant may know (e.g. from its own internal records) that the second customer is trustworthy, and further the second merchant may have sufficient funds so that the time value of money for that particular second merchant for a three day period (i.e. the time for an electronic check to clear) is low. The second merchant would much rather have the $100 or at least $99.95 without the credit card commission, and the second merchant in this example would be willing wait the three days for an equivalent type electronic check to clear.

Here, according to the invention, the second merchant would inform the computerized system that it would much rather take $99.95 in the form of an electronic check.

In the above examples, the universal payment system was shown being implemented by relatively static exchange rates that were based on typical transaction fees. However alternative mechanisms for implementing the system are also possible, and in some cases perhaps even preferable.

Consider the question of the true 3-day time value of money from the perspective of various merchants. For some merchants, this value may be as little as the prime interest rate computed over three days. However for other merchants, such as merchants in distress, this true value might be much harder, perhaps more comparable to what the first merchant would pay to sell its receivables in a factor financing type financial transaction. This type of situation can be used to create an electronic exchange or marketplace where a merchant more in need of rapid cash can bid for access to rapid cash, and receive access to such rapid cash from a merchant or other financial institution with a lower need for rapid cash, and so on.

Thus in some embodiments of the invention, the time value of money used to derive the various exchange rates or conversion factors for the universal payment account may be set by a competitive market among the various merchants or other financial entities participating in the system. Competitive bidding could also be used to encourage participating merchants to lend funds to the system as well. Alternatively this time value of money rate and other universal payment rates may be set by system policy, financial regulatory agency, or other mechanism.

In this embodiment, the invention's universal payment system and method may be implemented by creating a new type of electronic transaction system that acts as an exchange between many customers, many different customer payment methods, and many different merchants. This embodiment, in at least some respects, acts somewhat like a cross between a very short term financial money market, and a method of adjusting or normalizing payment amounts in a manner that adjusts for payment risks, fees, and times versus merchant financial needs in a manner that is quite superior to prior art methods.

Figure 1B:
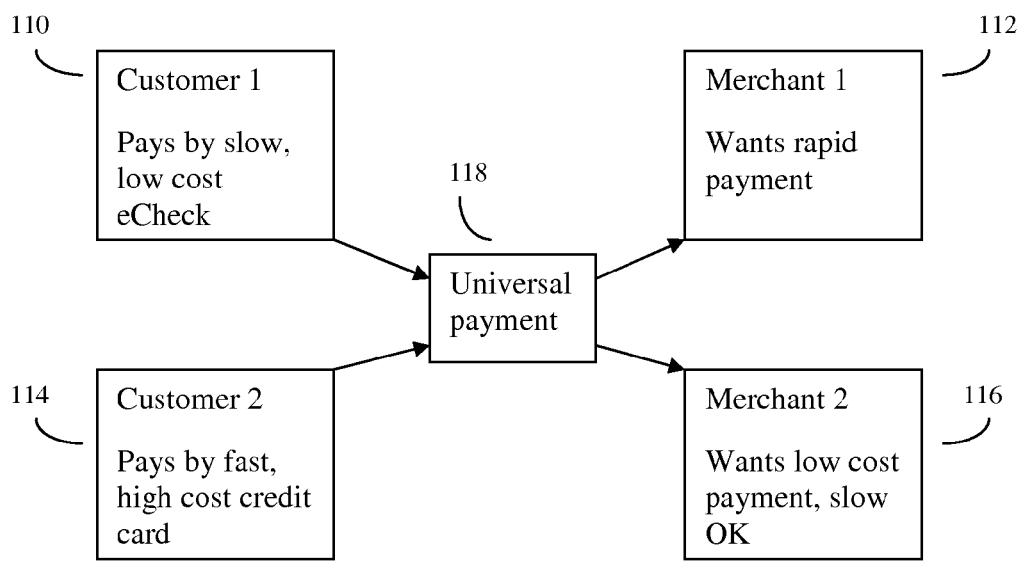
FIG. 1B shows the universal payment invention where an electronic market helps match the characteristics of a particular customer's payments (in terms of risk, payment costs, and payment times) with the individual needs of each merchant, and where a payment initially made in one form can be converted to a payment made by a different form.

An example of the electronic exchange embodiment of the invention is shown in FIG. 1B.

Here the invention's universal payment method acts somewhat as a matchmaker or electronic marketplace, allowing an instant "mix and match" between various forms of payment, but again with proper tracing and auditing functions to be in compliance with all due financial laws and regulations.

In this example, the first customer (110) has paid by a slow electronic check, but the first merchant (112) would really rather pay extra to get the money quickly. By contrast the second customer has paid by credit card (114), but the second merchant (116) who is not in a rush, trusts the customer and would really rather not pay the 3% commission. According to the invention, the universal payment account (118) acts somewhat like an electronic marketplace between the various customers and merchants, and allows (with proper electronic documentation and tracing to satisfy any anti-money laundering statutes, and other statutes such as the patriot act) participating merchants and customers to sort their various financial transaction in a way that promotes higher transaction efficiency.

As a net result, in our example, the first customer's payment by electronic check (110) would be diverted to the second merchant (116) who doesn't want to pay a high transaction fee, while the second customer's payment by credit card (114) would be diverted to the first merchant (112) who really needs the money quickly, and who is willing to pay a higher transaction fee to get it. Here this matching and diversion process will typically be done by a computer, or often a bank of computer servers, which will often store the various types of conversion and transaction data need to perform this "mix and match" process.

Although the computer servers that implement this "mix and match" process, and/or create the marketplace or other mechanism needed to provide the proper exchange rates to implement the universal payment system, could in principle be located anywhere, due to the sensitive nature of the various financial transactions, it is anticipated that regulators will likely require the system to be closely supervised and regulated. Thus at least this portion of the system may likely be performed under the supervision of a bank or other regulated financial institution, and will frequently be described in this application as occurring in a merchant bank, although of course other possibilities are both contemplated and claimed.

The invention's method is intended to be implemented in the form of various types of financial transaction software, running on various types of computerized devices, including various point-of-sale computerized devices, networks, computer servers, banks of servers (e.g. cloud computing), and mainframe servers Thus in practice, the various conversion factors required to convert to and from the universal payment account may be done by various methods, including system policy, fixed exchange rates, or standard financial market rates. However in at least some embodiments of the invention, these conversion factors may be settled by competitive electronic market bidding between the various merchants, and or other entities (e.g. banks, financial institutions, and the like) participating in the program. Again in these embodiments, the invention creates an electronic money market to that exists for approximately the duration of the float period required for a long duration payment method, such as an electronic check, to clear.

For purposes of this discussion going forward, assume that the various merchants and other financial entities have established the various conversion factors needed to implement the universal payment method as per the current market conditions at the time of the transaction.

Prior art financial transactions are often accompanied with various types of header information or data, such as information pertaining to the identity of the customer (required in the US under the patriot act), identify of the original point of sale device, ultimate beneficiary of the transaction, and other types of information as well. This information accompanies the financial transaction as it makes its way through the system.

The invention's method operates, in part, by attaching additional data, in the form of a universal payment trait and optimization header, to these various payment transactions, such as point-of-sale transactions. This additional data can either be added as an extension to prior art financial transaction headers, or alternatively can be added as its own separate header, as desired.

The additional payment header data required by the invention may include data that defines what payment outcome the merchant wants (e.g. fastest clearing time, least expensive clearing time, or least risk). This data will generally be accompanied by a record that has generic data—i.e. a normalized data model of all payment types) to produce any payment type.

This transaction will be initiated by the customer (either by a personal trait card, mobile application, terminal entry, and so on) and then be sent to a new type of bank processor.

The bank will also have automated records of the stored contracts with the merchant's customers allowing the conversion of the payment instrument to another payment type (e.g., a loyalty card into an electronic check). The bank processor will accept the header and payment record and process the header by searching the available options to determine the "best" payment option. It will then convert the generic record to the appropriate payment format and process through the appropriate payment system for authorization and/or clearing. A receipt for the customer will be returned.

In some embodiments, a retailer using this invention and format could request a fee for providing compliance/risk information. This can be done by submitting an option to give credit for additional information that is provided.

In some embodiments, with the invention a credit card could be swiped and the merchant processor would use the universal payment system and methods to change this payment to an electronic check. This may, of course, require present or prior consumer approval, as well as settlement reconciliation between the different systems, and a reconciliation of the rules between the different systems.

In some embodiments of the system, merchants who have information pertaining to the risks involved with a particular customer can use this risk information to further enhance payment efficiency. Here this risk information may be derived, at least in part, from non-public information, such as the merchant's record of customer purchases, payment history, and general loyalty to the merchant over time. For example, a customer who has routinely purchased from a merchant for years without problems might be automatically assigned to a lower risk category, and so on.

Figure 2:
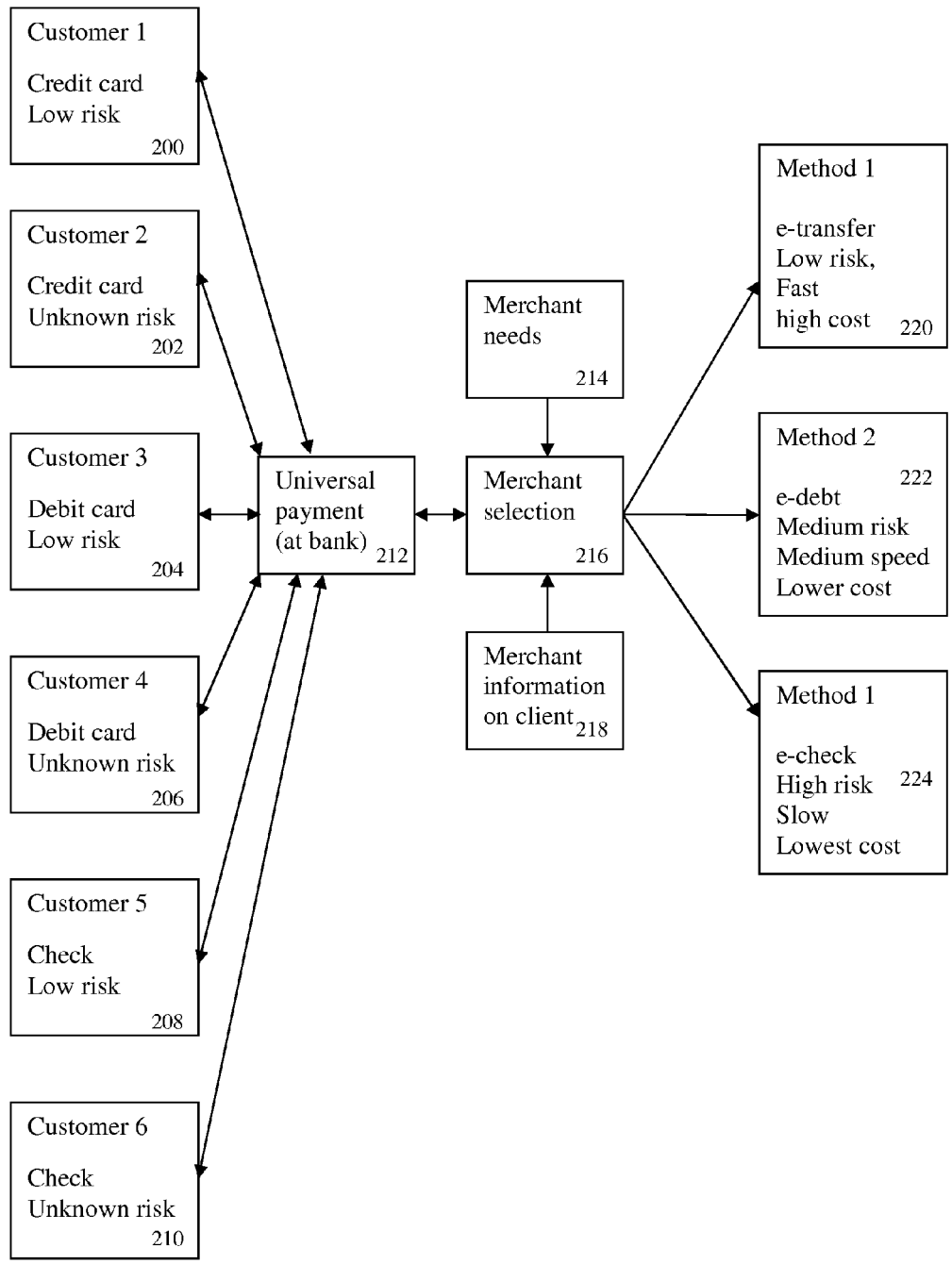
FIG. 2 gives an overview of how the universal payment method can help allow merchants, with varying tolerance for payment risks, payment speed, and payment transaction costs can use the universal payment system to handle different customers with different means of payment, each payment having different risks and payment speeds.

FIG. 2 gives an alternate perspective of how the universal payment method can help allow merchants, with varying tolerance for payment risks, payment speed, and payment transaction costs can use the universal payment system to handle different customers with different means of payment, each payment having different risks and payment speeds. Here the perspective is from the standpoint of a single merchant, and the complexities of the system in terms of operating a financial market place over a plurality of different merchants, as previously shown in FIG. 1B, are ignored in FIG. 2.

In FIG. 2, the merchant may be a larger merchant with multiple sites, and this merchant may be accepting payment from a plurality of customers, using a plurality of different payment methods, and using a plurality of different point of sale terminals. Further in this example, assume also that the merchant is keeping track of its customers, and can identify frequent, long term, or good customers (low risk customers) from new customers, that the merchant has not done business with before, and thus who may have unknown risk.

In this example, the merchant's point of sale terminals can be devices such as standalone, multi-lane store based, multi-lane corporate based, Personal Computer terminals (e.g. Via PC), terminals included in retail system, terminals included in the restaurant system, potable standalone terminals, mobile phone terminals, offline terminals, internet (e.g. PayPal) terminals, mail order terminals, telephone order terminals, or other point of sale mechanism.

Thus in FIG. 2, customers 1-6 (200, 202, 204, 206, 208, and 210) may be paying from different point-of sale terminals and/or using different payment methods. In (200), customer 1, that the merchant, perhaps because that customer has used the merchant for years, knows is low risk is paying by credit card, which is also low risk and delivers payment rapidly, but which also has high fees. In (202) customer 2, that the merchant cannot identify as a previous customer, and who thus has an unknown risk, also is paying by credit card. In (204), customer 3, known by the merchant to be low risk is paying by debit card, which is low risk but slow. In (206) customer 4, not known by the merchant, is also paying by debit card. In (208) customer 5, known by the merchant to be low risk, is paying by check. In (210), customer 6, not known by the merchant, is also paying by check.

Under the invention, all forms of payment are sent, along with appropriate informational headers, from the various point-of-sale computerized devices over a network to the computers, computer servers, and the like that host the universal payment system (212).

Depending on the universal payment system rules and policies (normally implemented by software on the computers, computer servers, and the like, that host the universal payment system (212), the merchant will be able to factor the merchant's overall financial needs (214) (e.g. need for fast payment, need for minimum service fees, need for minimum risk), as well as, in some embodiments, information about the risks associated with the customers (e.g. customer 1-6) who are making the various transactions.

In some embodiments of the invention, the merchant (216) will be able to use information (218) about the risk profile of each individual customer to direct the universal payment system to transfer payments from one modality (e.g. credit card) to another modality (e.g. echeck) according to merchant direction for each individual customer. In this embodiment, for example, merchant (216) might direct the universal payment system (212) to change customer 1 (200) payment from credit card to e-check (224) because the merchant trusts the customer, and thus wants to minimize transaction costs. Similarly the merchant might direct the universal payment system (212) to change customer 6 (210) who is writing a check, but who is unknown to the merchant into a safer but more expensive payment method such as a credit card style etransfer method (220). The merchant might also elect to keep the payment from customer 3 (204), known to the merchant, and known as being low risk, in its original payment format (222).

Allowing merchants to direct payments at the individual customer level has clear advantages at the individual merchant level, but potential disadvantages at the system level, because a merchant with great customer knowledge could potentially "game the system", to the disadvantage of other merchants using the universal payment system. Thus in some embodiments, system policies may be set up to restrict this level of granularity, and for example may restrict or outright prevent merchants from using information about the risk properties of the individual customers at the individual transaction level. Here these policies are easily implemented in the form of various software permissions at the universal payment system level, and these policies may be adjusted, based on use data, regulatory directives, or other method, to optimal settings.

The merchant's customers in principle can be using many different forms of payment. These various forms of payment can include Credit Cards, Checks, EBT, Drafts, Promise-to-pay, Script, Debit Card, Gift Card, Payroll Card, ACH, ATM Card, Paypal, Mobile phone, FOB or NFC device, coupons, discounts, cash, ePay or Bill pay, echeck, cross border transfers, wire transfer, Giro (payer instigated payment transfer from one bank account to another bank account, e.g. Automated Clearing House for direct deposit payments), Money Order or other form of payment.

Figure 3:
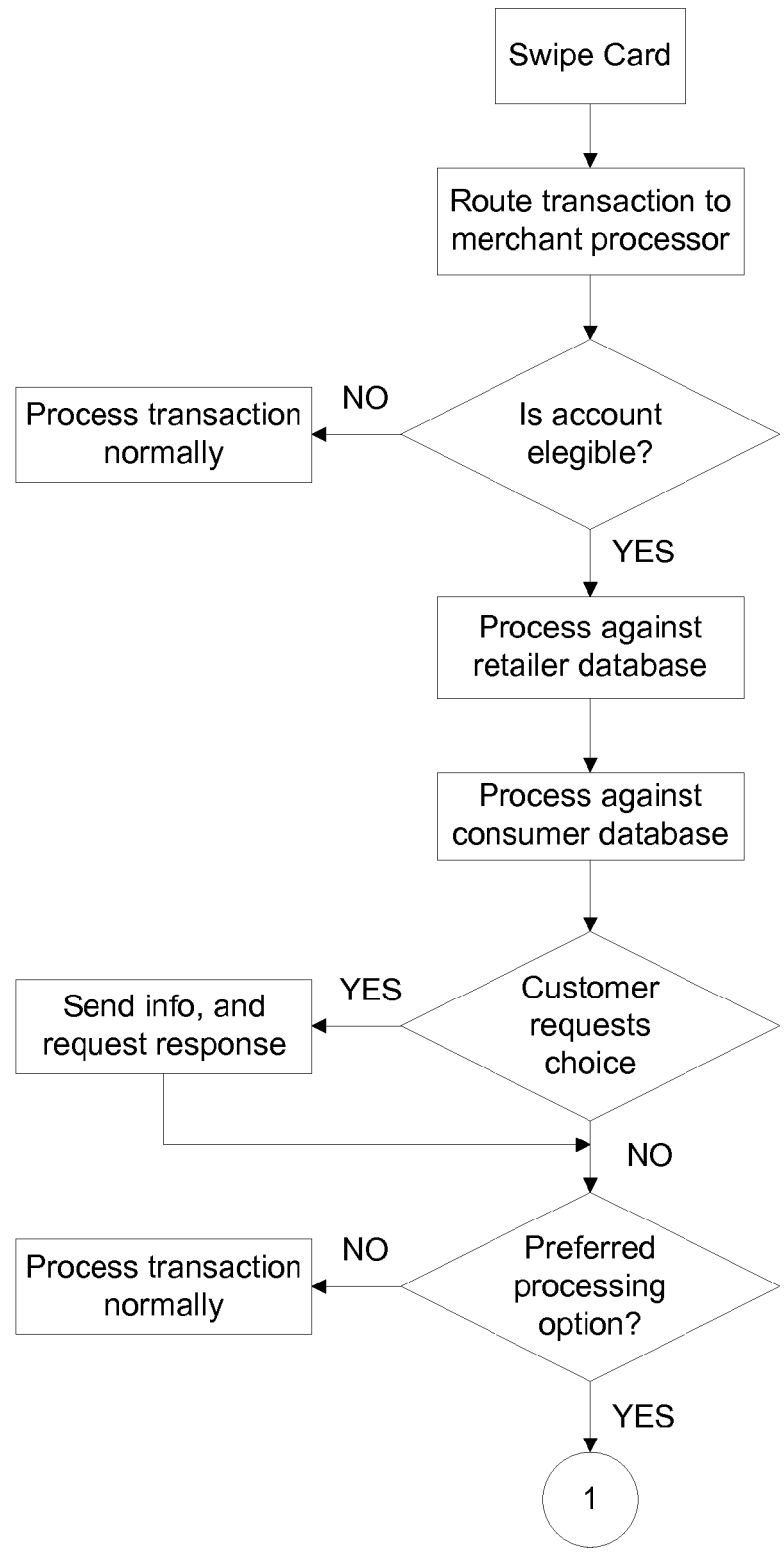
FIG. 3 shows an example of the universal payment method can be used to take a point-of-sale transaction (in this example a credit or debit card swipe), and if missing permissions or eligibility is absent, either process the transaction by prior art methods, or alternatively handle the transaction according to the invention's universal payment methods.

FIG. 3 shows an example of how the universal payment method can be used to take a point-of-sale transaction (in this example a credit or debit card swipe), and if permissions or eligibility are present or absent, either process the transaction by prior art methods, or alternatively handle the transaction according to the invention's universal payment methods.

Figure 4:
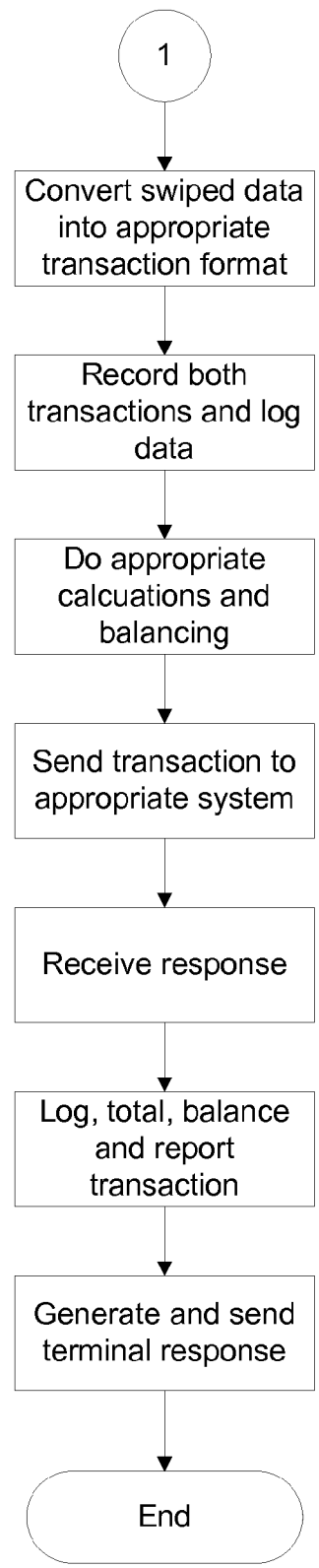
FIG. 4 shows a further example of how the invention's universal payment method can act to first convert the payment data to the universal payment account, and then in turn transfer the payment information from the universal payment account to the merchant account.

FIG. 4 shows a further example of how the invention's universal payment method can act to first convert the payment data to the universal payment account, and then in turn transfer the payment information from the universal payment account to the merchant account.

Figure 5:
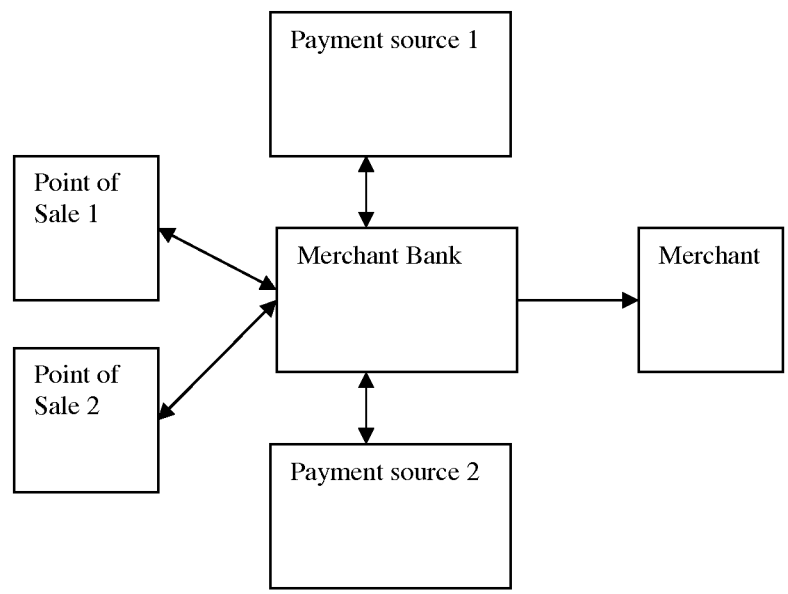
FIG. 5 shows how a merchant bank can use the universal payment method to handle transactions from different point-of-sale methods and different payment sources, and provide the merchant end user with a comprehensive payment system optimized for that particular merchant's needs.

FIG. 5 shows how a merchant bank can use the universal payment method to handle transactions from different point-of-sale methods and different payment sources, and provide the merchant end user with a comprehensive payment system optimized for that particular merchant's needs.

In some embodiments, the invention may include the following operations. Here assume that a merchant bank has modified its system to use the invention's universal payment processing methods.

First, a customer signs up for universal payment process and primary payment vehicle. They then send to the merchant's merchant bank processor. second, this customer uses a payment vehicle at a merchant's point of sale. Third, the merchant's point-of-sale computerized device or other equipment encrypts the sale data and universal payment format data (e.g. header data), and sends it to a merchant bank processor. Fourth, the merchant bank processor decrypts the universal payment format and, using the header, searches for the best payment method to employ as per the merchant's specified preferred payment methods. Fifth, the merchant bank processor transforms the incoming universal payment format into the appropriate payment method, and sends the transaction to the appropriate payment system. Sixth, the merchant bank processor receives the response from the payment system, and sends back a universal receipt to the original point-of-sale device. Seventh, the merchant bank processor then keeps track of the different payment methods used for the specific clearing period, and provides settlement reporting, fees and shared fees, risks, auditing information, and exceptions.

Figure 6:
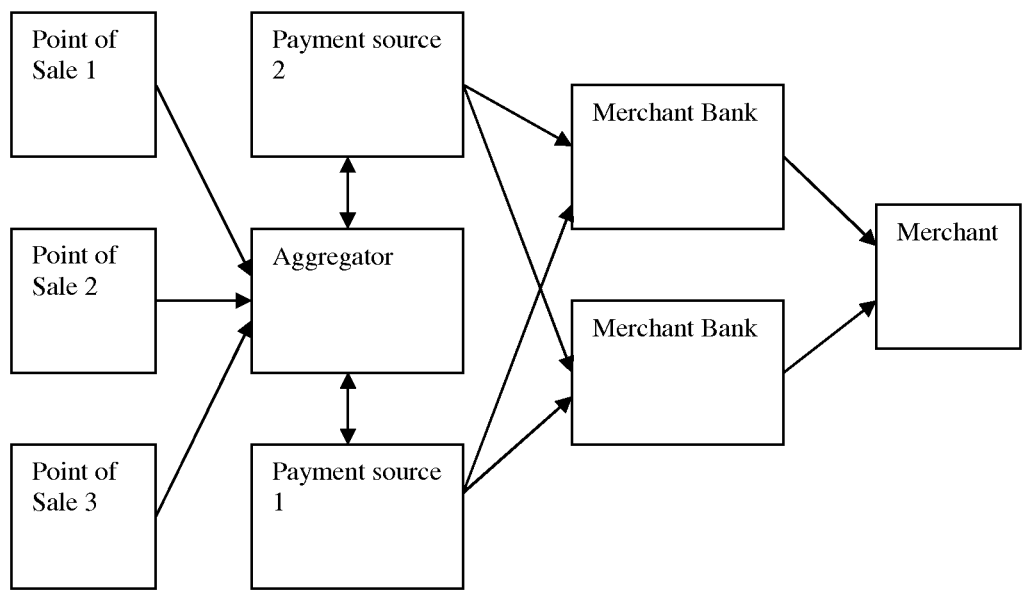
FIG. 6 shows how an aggregator, often used by larger corporations, can take transactions from multiple point of sale devices, multiple payment sources, and multiple merchant banks, and ultimately supply a larger merchant with a comprehensive payment system optimized for that particular merchant's needs.

FIG. 6 shows how an aggregator, often used by larger corporations, can take transactions from multiple point of sale devices, multiple payment sources, and multiple merchant banks, and ultimately supply a larger merchant with a comprehensive payment system optimized for that particular merchant's needs.

In some embodiments, it may be useful to make the software compliant with the Dodd-Frank Wall Street Reform and Consumer Protection Act ((Pub.L. 111-203, H.R. 4173). In particular, it may be important to maintain detailed traceability records of all funds so that financial regulators can, as needed, inspect and verify that all applicable regulations are being complied with.

The invention claimed is:

1. A computerized universal payment method to allow merchants with differing risk tolerance, transaction fee tolerance, and payment time tolerance to optimize customer payment transactions that have different associated risks, associated transaction fees, and associated transaction times, said method comprising;

customer adjusting at least one customer payment by a first customer adjustment function of customer permission, payment method, risk, transaction fee, and payment time;

producing at least one universal payment based on the adjusting of the at least one customer payment;

merchant adjusting said at least one universal payment by a second merchant adjustment function of merchant risk tolerance, transaction fee tolerance, and payment tolerance;

producing a merchant adjusted universal payment based on the adjusting of the at least one universal payment;

said customer adjustment and merchant adjustment being performed by at least one computer processor and computer memory; and transmitting said merchant adjusted universal payment to at least one merchant or financial representative of said at least one merchant.

2. The method of claim 1, wherein said at least one customer payment types comprise one or more payment types selected from the group consisting of Credit Cards, Checks, Electronic Benefit Transfer (EBT), Drafts, Promise-to-pay, Script, Debit Card, Gift Card, Payroll Card, Automated Clearing House (ACH), Automated Teller Machine (ATM) Card, Internet payment service, Mobile phone, Free On Board (FOB) contract or Near Field Communication (NFC) device, coupons, discounts, cash, ePay or Bill pay, echeck, cross border transfers, wire transfer, Giro, and Money Order.

3. The method of claim 1, wherein said at least one customer payment is entered from a point of sale device.

4. The method of claim 3, wherein said point-of-sale device comprises one or more point-of sale devices or terminals selected from the group consisting of Standalone, Multi-lane store based, Multi-lane corporate based, Via PC, Included in Retail System, Included in Restaurant System, Portable standalone, Mobile phone, offline, Internet payment terminal, Mail order, or Telephone order.

5. The method of claim 1, wherein when said at least one customer payment is transmitted over a network connection in the form of data; and the data representing said at least one customer payment also comprises a data header that at least partially ranks the merchant's preferences in terms of associated risks, associated transaction fees, and associated transaction times of payment.

6. The method of claim 5, wherein the desired merchant payment method has parameters; and the parameters of the desired merchant payment method specifies which merchant preference: lowest associated risk, lowest associated transaction fees, or lowest associated transaction times of payment is most important.

7. The method of claim 5, wherein the merchant further uses information about the customer to determine said merchant preference.

8. The method of claim 5, wherein the desired merchant payment method has parameters; and the parameters of the desired merchant payment method specify at least one of a maximum associated risk, maximum associated transaction fee, or maximum associated transaction times of payment.

9. The method of claim 8, wherein the merchant further uses information about the customer to determine said merchant preference.

10. The method of claim 1, wherein the first customer adjustment function of customer permission, payment method, risk, transaction fee, and payment time, and the second merchant adjustment function of merchant risk tolerance, transaction fee tolerance, and payment tolerance is done by an electronic marketplace between a plurality of merchants, or a plurality of other financial entities, or a mixture of merchants and other financial entities.

11. A computerized universal payment method to allow merchants with differing risk tolerance, transaction fee tolerance, and payment time tolerance to optimize customer payment transactions that have different associated risks, associated transaction fees, and associated transaction times, said method comprising:

Obtaining formation pertaining to at least one customer payment from at least one point-of-sale computerized device, and transmitting said information over an electronic or wireless network to a universal payment computer;

customer adjusting at least one customer payment by a first customer adjustment function of customer permission, payment method, risk, transaction fee, and payment time;

producing at least one universal payment based on the adjusting of the at least one customer payment;

merchant adjusting said at least one universal payment by a second merchant adjustment function of merchant risk tolerance, transaction fee tolerance, and payment tolerance;

producing a merchant adjusted universal payment based on the adjusting of the at least one universal payment;

said customer adjustment and merchant adjustment being performed by at least one computer processor, computer memory, and software containing instructions to implement said method; and using an electronic or wireless network to transmit said merchant adjusted universal payment to at least one merchant or financial representative of said at least one merchant.

12. The method of claim 11, wherein said at least one customer payment is transmitted over a network connection in the form of data; and the data representing said at least one customer payment also comprises a data header that at least partially ranks the merchant's preferences in terms of associated risks, associated transaction fees, and associated transaction times of payment.

13. The method of claim 12, wherein the desired merchant payment method has parameters; and the parameters of the desired merchant payment method specifies which merchant preference: lowest associated risk, lowest associated transaction fees, or lowest associated transaction times of payment is most important.

14. The method of claim 12, wherein the merchant further uses information about the customer to determine said merchant preference.

15. The method of claim 12, wherein the desired merchant payment method has parameters; and the parameters of the desired merchant payment method specify at least one of a maximum associated risk, maximum associated transaction fee, or maximum associated transaction times of payment.

16. The method of claim 15, wherein the merchant further uses information about the customer to determine said merchant preference.

17. The method of claim 11, wherein the first customer adjustment function of customer permission, payment method, risk, transaction fee, and payment time, and the second merchant adjustment function of merchant risk tolerance, transaction fee tolerance, and payment tolerance is done by an electronic marketplace between a plurality of merchants, or a plurality of other financial entities, or a mixture of merchants and other financial entities.

18. A computerized universal payment method to allow merchants with differing risk tolerance, transaction fee tolerance, and payment time tolerance to optimize customer payment transactions that have different associated risks, associated transaction fees, and associated transaction times, said method comprising;

Obtaining formation pertaining to at least one customer payment from at least one point-of-sale computerized device, and transmitting said information over an electronic or wireless network to a universal payment computer;

customer adjusting at least one customer payment by a first customer adjustment function of customer permission, payment method, risk, transaction fee, and payment time;

producing at least one universal payment based on the adjusting of the at least one customer payment;

merchant adjusting said at least one universal payment by a second merchant adjustment function of merchant risk tolerance, transaction fee tolerance, and payment tolerance;

producing a merchant adjusted universal payment based on the adjusting of the at least one universal payment;

wherein data representing said at least one customer payment also comprises a data header that at least partially ranks the merchant's preferences in terms of associated risks, associated transaction fees, and associated transaction times of payment;

wherein the first customer adjustment function of customer permission, payment method, risk, transaction fee, and payment time, and the second merchant adjustment function of merchant risk tolerance, transaction fee tolerance, and payment tolerance is done by an electronic marketplace between a plurality of merchants, or a plurality of other financial entities, or a mixture of merchants and other financial entities;

said customer adjustment and merchant adjustment being performed by at least one computer processor, computer memory, and software containing instructions to implement said method; and using an electronic or wireless network to transmit said merchant adjusted universal payment to at least one merchant or financial representative of said at least one merchant.

19. The method of claim 18, wherein the desired merchant payment method has parameters;

the parameters of the desired merchant payment method specifies which merchant preference: lowest associated risk, lowest associated transaction fees, or lowest associated transaction times of payment is most important; and wherein the parameters of the desired merchant payment method also specify at least one of a maximum associated risk, maximum associated transaction fee, or maximum associated transaction times of payment.

20. The method of claim 18, wherein the merchant further uses information about the customer to determine said merchant preference.

* * * * *